United States Patent [19]
Soliman

[11] Patent Number: 5,799,005
[45] Date of Patent: Aug. 25, 1998

[54] SYSTEM AND METHOD FOR DETERMINING RECEIVED PILOT POWER AND PATH LOSS IN A CDMA COMMUNICATION SYSTEM

[75] Inventor: Samir S. Soliman, San Diego, Calif.

[73] Assignee: Qualcomm Incorporated, San Diego, Calif.

[21] Appl. No.: 641,303

[22] Filed: Apr. 30, 1996

[51] Int. Cl.[6] .................................................. H04B 7/216
[52] U.S. Cl. .......................... 370/335; 455/501; 455/63
[58] Field of Search ............................. 370/320, 335, 370/342, 332, 328, 500; 375/200; 455/422, 439, 501, 504, 505, 506, 63; 379/59, 60

[56] References Cited

U.S. PATENT DOCUMENTS

| | | | |
|---|---|---|---|
| 5,093,840 | 3/1992 | Schilling. | |
| 5,179,571 | 1/1993 | Schilling. | |
| 5,299,226 | 3/1994 | Schilling. | |
| 5,448,754 | 9/1995 | Ho et al. | 379/59 |
| 5,491,837 | 2/1996 | Haartsen | 379/59 |
| 5,577,022 | 11/1996 | Padovani et al. | 379/60 |
| 5,604,730 | 2/1997 | Tiedemann, Jr. | 370/335 |

*Primary Examiner*—Ajit Patel
*Attorney, Agent, or Firm*—Russell B. Miller; Roger W. Martin

[57] ABSTRACT

A system and method for estimating the quality and path loss associated with a communications channel on the basis of the power of a pilot signal received by a communications receiver. The communications receiver measures a received signal power, and also makes a relative pilot strength measurement of a received pilot signal. The power of the pilot signal is then computed using the received signal power and the relative pilot strength measurement. An indication of channel quality based on the pilot signal power may be provided to a user of the communications receiver. Path loss of a communication channel between a base station and a remote site station is also estimated. The base station also transmits an indication of the power at which the pilot signal was transmitted. An estimate of the path loss is then made by determining the difference between the indicated power of the transmitted pilot signal and the received pilot signal power.

27 Claims, 6 Drawing Sheets

SYSTEM AND METHOD FOR DETERMINING RECEIVED PILOT POWER AND PATH LOSS IN A CDMA COMMUNICATION SYSTEM

BACKGROUND OF THE INVENTION

I. Field of the Invention

The present invention relates to communication systems. More particularly, the present invention relates to an improved system and method for determining, in a code division multiple access (CDMA) communication system, the power of a received pilot signal received by a remote site station and for using this value to more accurately estimate path loss between the remote site station and a base station.

II. Description of the Related Art

In a CDMA cellular telephone system, such as that described in Telecommunications Industry Association (TIA)/Electronic Industries Association (EIA) Interim Standard 95 (IS-95) entitled "Mobile Station-Base Station Compatibility Standard for Dual-Mode Wideband Spread Spectrum Cellular System," a common frequency band is used for communication with all base stations in a system. The common frequency band allows simultaneously communication between a mobile station and more than one base station. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

The path loss in the CDMA mobile radio channel can be characterized by two separate phenomena: average path loss and fading. The forward link, from the base station to the mobile station, operates on a different frequency than the reverse link, which is directed from the mobile station to the base station. However, because the forward link and reverse link frequencies are within the same frequency band, a significant correlation between the average path loss of the two links exists. On the other hand, fading is an independent phenomenon for the forward link and reverse link and varies as a function of time.

In an exemplary CDMA system, each mobile station estimates the total received power of desired CDMA signals on the assigned CDMA frequency channel of the forward link based on the total received power of all signals in the CDMA bandwidth at the input to the mobile station. The total received power is comprised of the sum of the power of a desired CDMA signal received from the base station presently assigned to the mobile station, and the power of various interfering signals that fall within the CDMA bandwidth. Such interfering signals may be received from other CDMA base stations operating on the frequency assigned to the mobile station, as well as from other nearby communication systems. Since the path loss on the forward and reverse links are assumed to be closely correlated, the mobile station uses the estimate of the forward link power to set the transmit level of the reverse link signal. The transmit level of the reverse link signal is adjusted in order to match the estimated path loss on the reverse link, and arrive at the base station at a predetermined level. Such an open-loop power control system is described in U.S. Pat. No. 5,056,109 entitled "METHOD AND APPARATUS FOR CONTROLLING TRANSMISSION POWER IN A CDMA CELLULAR MOBILE TELEPHONE SYSTEM", assigned to the assignee of the present invention and incorporated herein by reference.

The mobile station may also provide an indication of channel quality to its user based on the estimated path loss. When the estimated path loss is high, the user may be informed through a display or the like that adverse channel quality may be experienced if it were attempted to initiate communication. Conversely, an indication of acceptable channel quality may be provided when the estimated path loss is below a predefined threshold. Such indications of channel quality assist the user in determining whether communication with the base station may be sustained. For example, a typical mobile station may have a visual display of a number of "signal level bars" that indicate the relative strength of the received energy on the forward link from the cell-site to the mobile station, and therefore the estimated path loss of the reverse link from the mobile station to the cell-site.

Additionally, the mobile station uses the estimated path loss in determining the power level it should transmit access probes in order to establish communications with the base station on the access channel. The access channel provides communications from the mobile station to the base station when the mobile station is not using a traffic channel (i.e. when a call is not already in progress). Access channel messages provide for call originations, responses to pages, orders, and registrations. Since the access channel in a typical CDMA communication system is a random access channel, multiple mobile stations may simultaneously try to use the access channel. Although the mobile station randomly chooses a PN time alignment to minimize collisions with other mobile stations that are simultaneously transmitting on the access channel, each additional mobile station transmitting on the access channel contributes to the background noise on the channel, which has a finite capacity.

Unfortunately, the presence of interfering signals within the total power received by the mobile station tends to significantly reduce the accuracy of the mobile station's estimate of path loss. When such an inappropriately reduced estimate of path loss is used to set the open-loop transmit level of the reverse link signal, the level may be lowered below that necessary to ensure the reverse link signal is received with adequate strength at the base station. Similarly, when an inappropriately reduced estimate of path loss results in an overly favorable indication of channel quality being provided to a user, the user may be unsuccessful at initiating communication over the degraded channel. This may lead to user frustration, since the user would expect that it should be possible to establish communication when informed of the existence of favorable channel conditions. Additionally, the inaccurate estimate of path loss would lead to the mobile station sending out initially weaker access probes, resulting in multiple unsuccessful attempts to establish communication on the access channel, and therefore unnecessarily wasting some of the access channel capacity and having an adverse effect on the balance of system loading.

Another way in which the total received power at the mobile station is used is when a network planner is mapping a proposed service area in order to determine coverage. In a conventional mapping method, the total received power at the mobile station (including unwanted interference) is logged and then post-processed to generate contour maps that represent the coverage area. However, since the maps are based on total received power, they are inaccurate to the extent that unwanted interference is present. Although post-processing may be able to remove some of the effects of unwanted interference in the measurement bandwidth, this requires an extra step, adding time and cost.

It should be noted that the above described problems exist in non-cellular CDMA communication systems as well, such as PCS or wireless local loop systems. What is needed is an accurate method for estimating the path loss and channel quality between a base station and a remote station in a CDMA communication system.

SUMMARY OF THE INVENTION

In the present invention, the error in the estimate of the quality of the reverse link introduced by the presence of background interference is eliminated. The present invention is directed to a system and method for determining the power of a pilot signal included within a spread-spectrum signal received by a communications receiver, thereby enabling accurate estimation of channel quality and path loss. Within the communications receiver, a received signal power of the spread-spectrum signal is measured. A relative pilot strength measurement is also made of the pilot signal received with the spread-spectrum signal. The power of the pilot signal is then computed on the basis of the received signal power and the relative pilot strength measurement. In a preferred implementation, an indication of channel quality based on the pilot signal power is provided to a user of the communications receiver.

In another aspect, the present invention provides a system and method for estimating path loss of a communication channel between a base station and a remote site station. The base station transmits to the remote site station a pilot signal, and also transmits to the remote site station an indication of the power at which the pilot signal was transmitted. At the remote site station, a total received signal power over the CDMA bandwidth is measured and a relative pilot strength measurement is made of the received pilot signal. The power of the received pilot signal is then computed on the basis of the received signal power and the relative pilot strength measurement. An estimate of the path loss is then made by determining the difference between the indicated power of the transmitted pilot signal and the received pilot signal power.

By using the CDMA power of the pilot signal to estimate the quality of the reverse link, the present invention avoids the errors introduced by the presence of background interference in the CDMA bandwidth. The present invention, therefore, results in a significantly more accurate estimation of reverse link quality. Additionally, by directly determining path loss, rather than estimating it from the total received power, the present invention is also useful for network planning. A direct survey of path loss may be made from data logged by the mobile station, rather than requiring a post-processing of the total received power in order to generate a service area map.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

Figure 1:
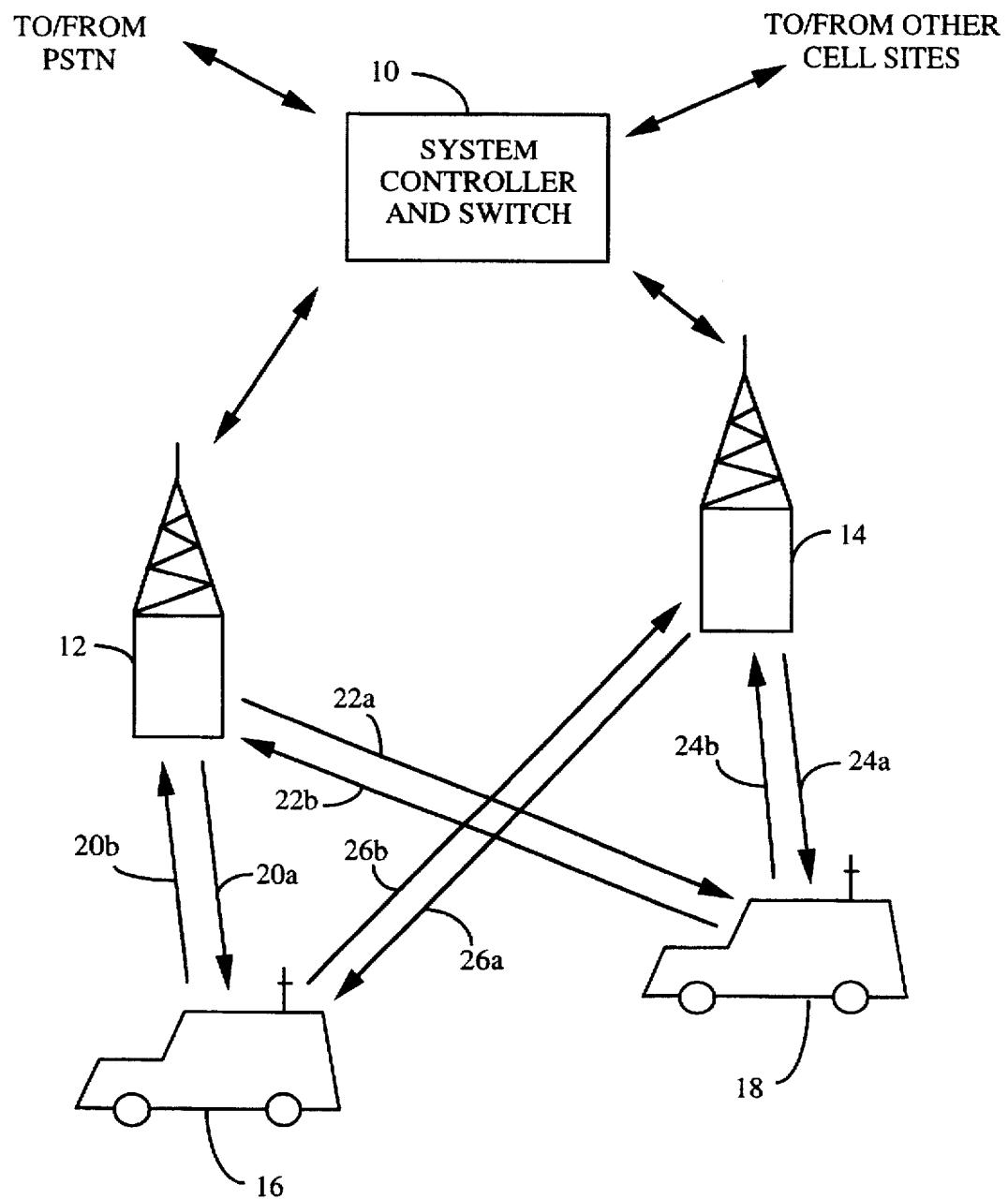
FIG. 1 illustratively represents a conventional cellular mobile telephone system.

A conventional cellular mobile telephone system is illustrated in FIG. 1. The system illustrated in FIG. 1 utilizes CDMA modulation techniques in communications between the system mobile user and the cell-sites. Cellular systems in large cities may have hundreds of cell-site stations servicing hundreds of thousands of mobile telephones. The use of CDMA techniques readily facilitates increases in user capacity in systems of this size as compared to conventional FM modulation cellular systems.

In FIG. 1, a system controller and switch 10 typically includes appropriate interface and processing hardware for providing system control information to the cell-sites. Controller 10 controls the routing of telephone calls from the public switched telephone network (PSTN) to the appropriate cell-site for transmission to the appropriate mobile unit. Controller 10 also controls the routing of calls from the mobile units via at least one cell-site to the PSTN. Controller 10 may direct calls between mobile users via the appropriate cell-site stations since such mobile units do not typically communicate directly with one another.

Controller 10 may be coupled to the cell-sites by various means such as dedicated telephone lines, optical fiber links or by radio frequency communications. In FIG. 1, two exemplary mobile units 16 and 18 which include cellular telephones are illustrated. Arrows 20a–20b and 22a–22b respectively define the possible communication links between cell-site 12 and mobile units 16 and 18. Similarly, arrows 26a–26b respectively define the possible communication links between cell-site 14 and mobile units 18 and 16.

In the conventional CDMA system of FIG. 1, mobile unit 16 measures the total received power of all radio frequency (RF) energy in the frequency bandwidth of signals transmitted by cell-sites 12 and 14 upon forward link paths 20a and 26a. Similarly, mobile unit 18 measures the total received power of all radio frequency (RF) energy in the frequency bandwidth of signals transmitted by cell-sites 12 and 14 upon paths 22a and 24a. In each of mobile units 16 and 18, signal power is measured in the receiver while the signals are wideband signals. Accordingly, in a conventional CDMA system, this power measurement is made prior to correlation of the received signals with a pseudonoise (PN) spectrum spreading signal.

When mobile unit 16 is closer to cell-site 12, the received signal power should be dominated by the signal traveling path 20a. When mobile unit 16 is nearer to cell-site 14, the received power should be dominated by the signals traveling on path 26a. Similarly, when mobile unit 18 is closer to cell-site 14, the received power should be dominated by the signals on path 24a. When mobile unit 18 is closer to cell-site 12, the received power should be dominated by the signals traveling on path 22a.

In a conventional CDMA system, each of mobile units 16 and 18 uses the resultant measurement of total received power on the forward link 20a–26a to estimate the path loss on the reverse link 20b–26b to the closest cell-site. The estimated path loss is used to determine the nominal mobile station transmitter power required to obtain the desired carrier-to-noise ratio in the cell-site receiver. The knowledge by the mobile units of the cell-site parameters may be either fixed in memory or transmitted in cell-site information signals broadcast on a common channel to indicate other than nominal conditions for a particular cell-site.

Since the mobile units 16 and 18 rely upon measurement of the wideband total received signal power in estimating path loss to the closest cell-site, interfering signals received from other cell-sites and/or from neighboring cellular systems may result in an inaccurately low path loss estimate. As was previously discussed, this may result in an inadequate level of reverse link signal power being transmitted to the closest cell-site, and an overly favorable indication of channel quality being provided to the mobile station user. This inaccuracy may also result in the mobile station being required to transmit more than one access probe to initiate communication on the access channel. These unnecessary multiple probes will clutter the system with undesirable interference that will result in performance degradation.

As is described herein, the present invention facilitates accurate estimation of path loss through determination of the loss experienced by a spread spectrum "pilot" reference signal. In an exemplary CDMA communication system each base station continuously transmits an unmodulated, direct-sequence spread spectrum pilot signal. This pilot signal allows a mobile station to acquire the timing of the forward CDMA channel, provides a phase reference for coherent demodulation by the mobile station, and provides a means for signal strength comparisons between base stations for determining when to handoff. The pilot signal transmitted by each base station in a CDMA system may use the same PN code but with a different code phase offset meaning that the PN codes transmitted by neighboring base stations are identical but skewed in time with respect to one another. Phase offset allows the pilot signals to be distinguished from one another according to the base station from which they originate. A system employing such a pilot signal is described in U.S. Pat. No. 5,103,459 entitled "SYSTEM AND METHOD FOR GENERATING SIGNAL WAVEFORMS IN A CDMA CELLULAR TELEPHONE SYSTEM", assigned to the assignee of the present invention and incorporated herein by reference.

In accordance with one aspect of the invention, the power of the pilot signal received by a given mobile unit from the base station with which the mobile unit is in communication is determined using a pair of signal measurements made at the mobile unit. In particular, a pilot strength measurement (in dB) is summed with a measurement of the total signal power (in dBm) received by the mobile unit in order to determine the power of the received pilot signal. Specifically, $$P_{pilot} = E_c/I_0 + P_{total}$$

where $P_{total}$ is the total received signal power (dBm), $E_c/I_0$ is the pilot strength measurement (dB), and $P_{pilot}$ is the power of the received pilot signal. The term $E_c$ (energy per chip) corresponds to the received pilot signal energy during one chip period, and the term $I_0$ denotes total received spectral power density in the CDMA signal bandwidth. The pilot strength measurement $E_c/I_0$ is thus seen to provide an indication of received pilot signal energy power relative to total received power.

Once the absolute power $P_{pilot}$ of the received pilot signal has been ascertained, the path loss between the base station and the mobile unit may be determined using an indication of the power at which the pilot signal was transmitted ($P_{transmitted\ pilot}$) from the base station. In a conventional CDMA system, in addition to the pilot channel, each cell-site also transmits a setup or "sync" channel. This channel uses the same PN sequence and phase offset as the pilot channel and can be demodulated whenever the pilot channel is being tracked. This sync channel carries, among other things, cell site identification, and the cell site pilot PN carrier phase offset. With this information, the mobile station is capable of establishing system time. A system employing such a sync channel is further described in the above mentioned U.S. Pat. No. 5,103,459. In an exemplary implementation the base station provides an indication of the power at which the pilot signal was transmitted ($P_{transmitted\ pilot}$) on the sync channel using the 3-bit reserved field of the IS-95 Sync Channel Message. The path loss may then be computed by taking the difference between the transmitted pilot power and the received pilot power, and an indication given to the mobile unit user as to the estimated quality of the reverse link based on the measured path loss on the forward link.

Figure 2:
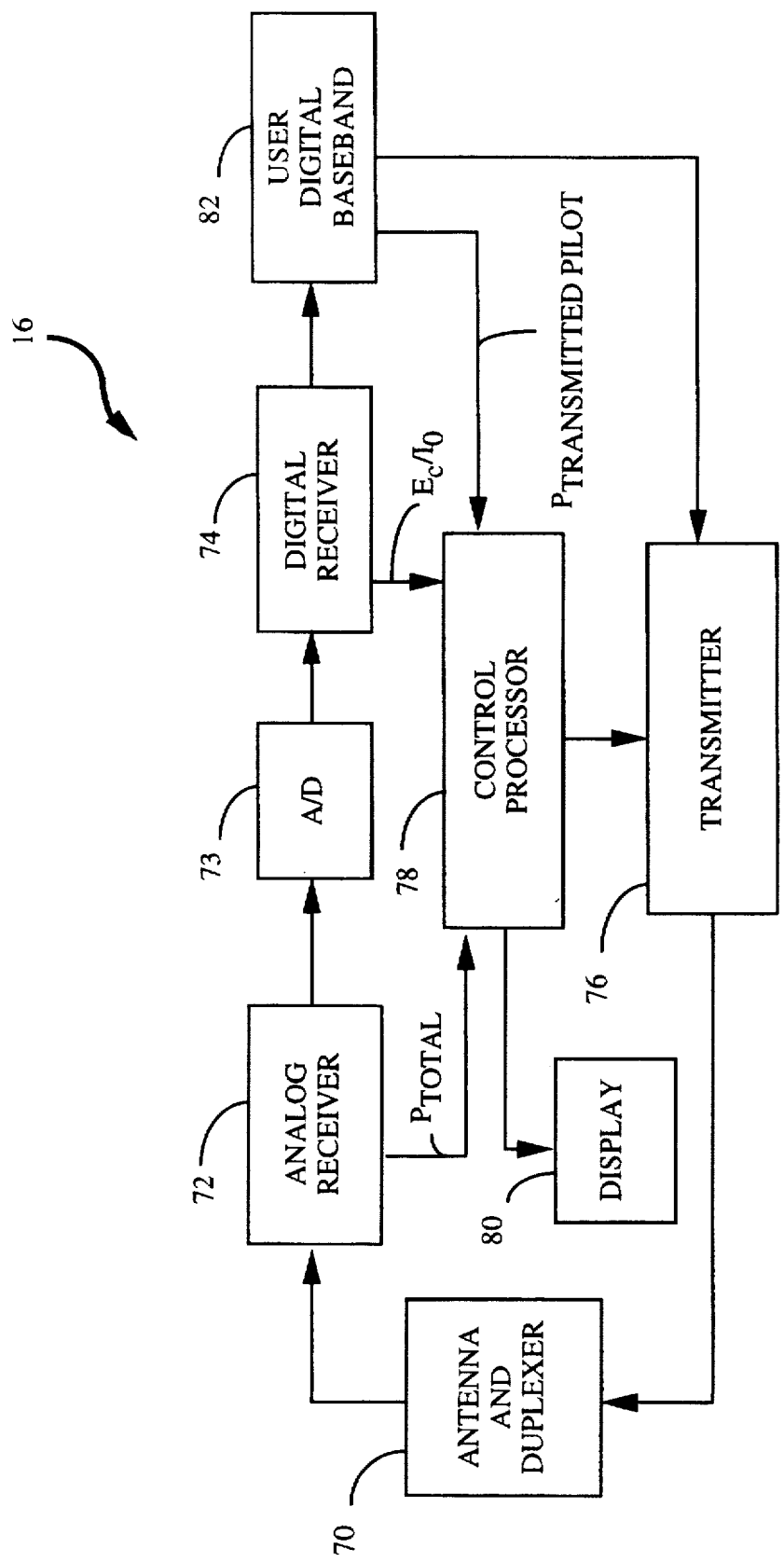
FIG. 2 is block diagram of a mobile unit included within the mobile telephone system of FIG. 1.

FIG. 2 is block diagram of the mobile unit 16 of the present invention, which may be assumed to be substantially identical to the mobile unit 18. In FIG. 2, mobile unit 16 includes an antenna and duplexer 70 for collecting cell site transmitted signals and radiating mobile unit generated CDMA signals. The mobile unit receives the pilot signal, other common channel signals and the traffic signals addressed thereto using antenna and duplexer 70, analog receiver 72 and digital receiver 74. Analog receiver 72 amplifies and frequency down-converts the received RF CDMA signals to IF, and filters the IF signals. The IF signals are output to analog to digital (A/D) converter 73, and the resultant digital data provided to digital receiver 74 for digital processing. As is described below, analog receiver 72 also includes circuitry for performing an analog measurement of the total power of the received signals in the CDMA bandwidth.

Digital data receiver 74 is used for despreading and correlating the received signals addressed to the mobile unit. Digital receiver 74 also separates the digital traffic data from closed loop power adjustment command generated by the cell site. The closed loop power adjustment command data bits are sent to control processor 78. Processor 78 may be a microprocessor as is well known in the art, comprising computation means, memory, and means for generating control signals. Processor 78 generates a transmit power control command that is provided to transmitter 76. Digital receiver 74 also provides data such as digitized encoded speech to user digital baseband circuitry 82 for decoding and interface with the user. Baseband circuitry 82 includes interface hardware for coupling digital receiver 74 and a transmit modulator (not shown) within the transmitter 76 to the user handset (not shown).

Control processor 78 is also coupled to display 80, and generates a quality indication signal for visual and/or audio indication by display 80 of signal strength to the user. Display 80 may be an LED or LCD or the like as is well known in the art, and may further employ an audio speaker for audio tone generation.

Figure 3:
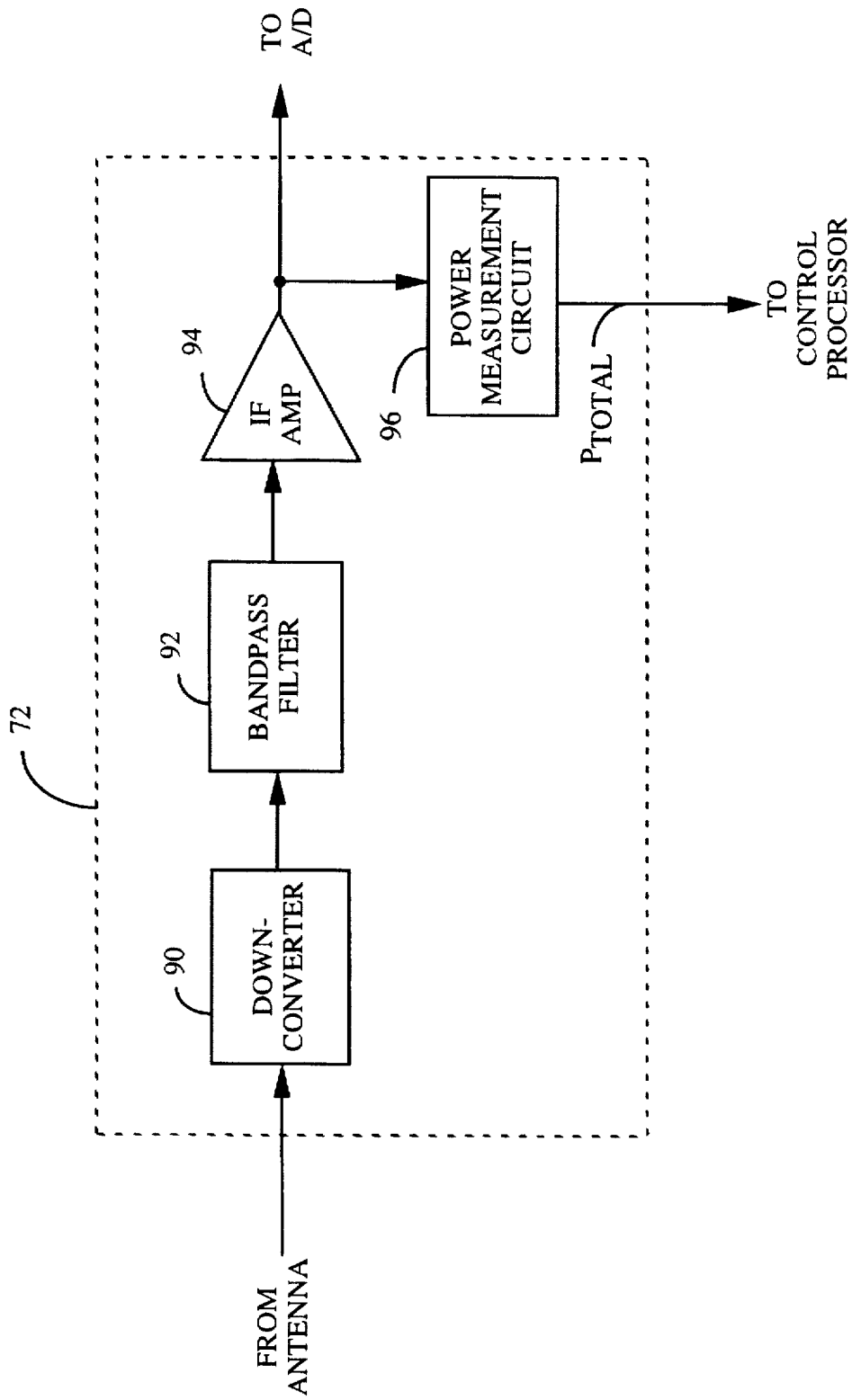
FIG. 3 illustrates in further detail an analog receiver within the mobile unit of FIG. 2.

FIG. 3 illustrates in further detail the analog receiver 72. In FIG. 3, received RF signals from the antenna and duplexer 70 are provided to frequency downconverter 90 where the received RF signals are converted to an IF frequency. The IF frequency signals are coupled to bandpass filter 92 where out of band frequency components are removed from the signals.

The filtered signals are output from filter 92 to variable gain IF amplifier 94 where the signals are amplified. The amplified signals are output from amplifier 94 to an analog to digital (A/D) converter (not shown) for subsequent digital signal processing operations on the signals. The output of amplifier 94 is also coupled to power measurement circuit 96. power measurement circuit 96 generates a received signal strength signal, $P_{TOTAL}$, indicative of the total wideband received signal power. This signal, $P_{TOTAL}$, is provided to control processor 78, where it is used as described below to estimate path loss between the mobile unit 16 and the cell-site 12.

Figure 4:
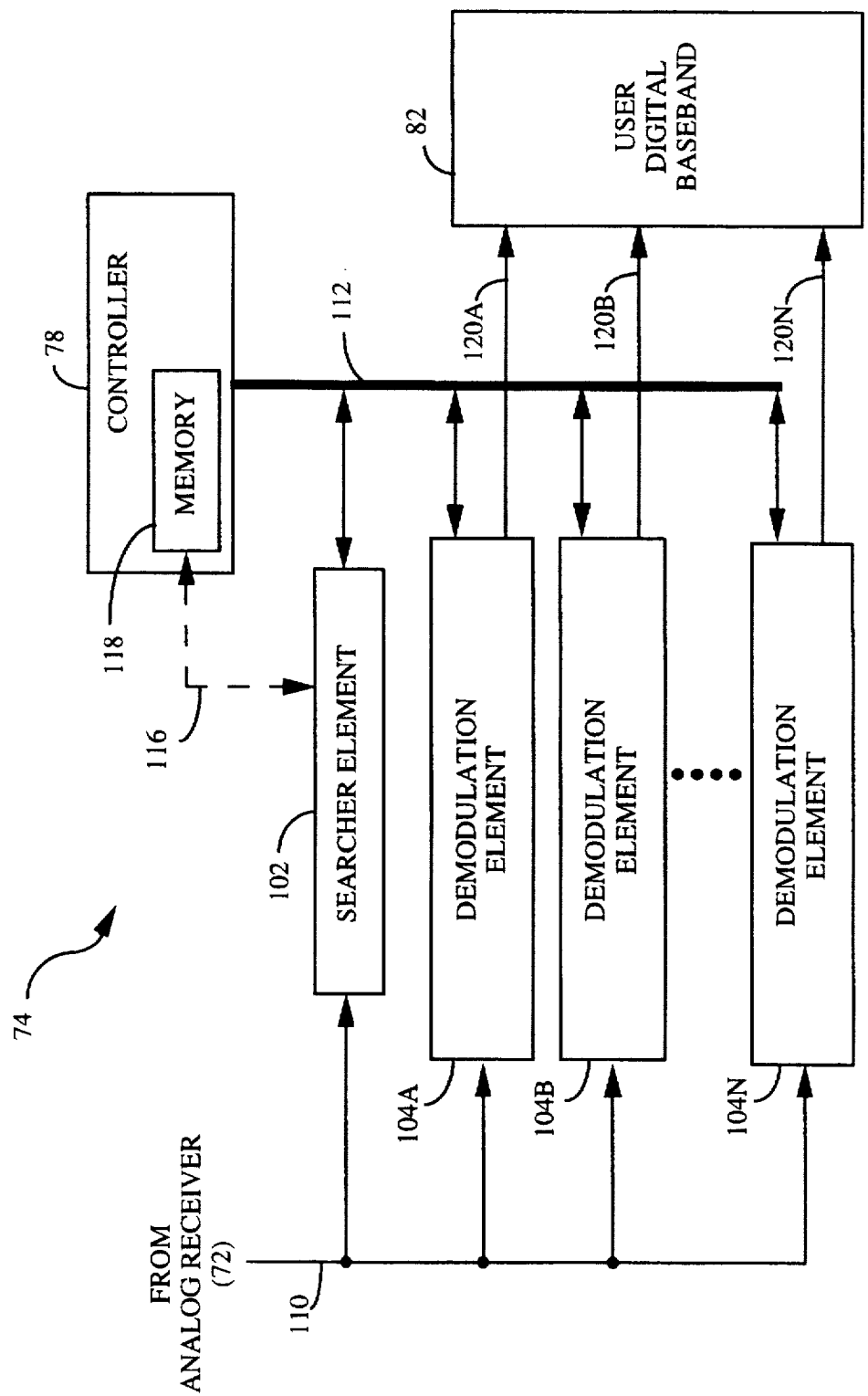
FIG. 4 is a detailed illustration of a digital receiver within the mobile unit.

FIG. 4 illustrates the digital receiver 74 in greater detail. The receiver 74 includes a plurality of demodulation elements 104 controlled by controller 78 through interconnection 112. Input signal 110 from analog receiver 72 is seen to be provided to searcher element 102 and demodulation elements 104A–104N. Searcher element 102 continually scans the time domain searching for pilot signals from nearby base stations. Searcher element 102 also scans a set of time offsets around the nominal arrival of the signal from each base station in search of multipath signals that have developed.

Searcher element 102 passes the developed data to controller 78. Searcher element 102 may pass data through interconnection 112. Alternatively, searcher element 102 may pass data to controller 78 through direct memory access. Direct memory access allows searcher element 102 to pass information directly to controller memory 118 without interrupting controller functions. Direct memory access operation is illustrated by dashed data line 116 that is directly connected from searcher element 102 to memory 118 within controller 78. Controller 78 uses the data stored in memory 118 to assign demodulation elements 104A–104N to one of the plurality of information signals that may be contained in input signal 110.

Demodulation elements 104A–104N process input signal 110 to produce soft decision data bits 120A–120N that are combined by a symbol combiner (not shown) within user baseband circuitry 82. The output of symbol combiner (not shown) is aggregate soft decision data suitable for Viterbi decoding. Demodulation elements 104A–104N also provide several output control signals to controller 78 through interconnection 112 that are used in the assignment process.

Figure 5:
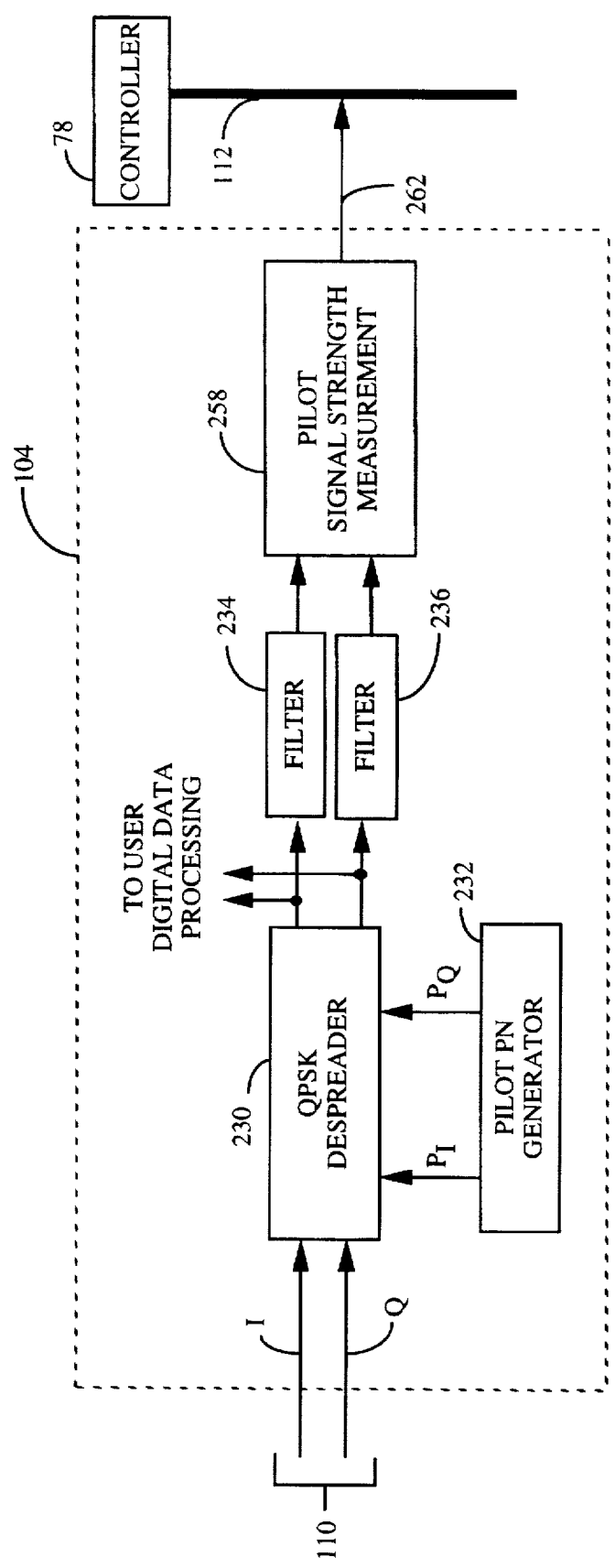
FIG. 5 illustrates a selected portion of a demodulation element of the digital receiver.

Each of demodulation elements 104A–104N is highly similar in structure to the others. FIG. 5 illustrates a selected portion of a demodulation element 104 of FIG. 4 in further detail. In FIG. 5, input signal 110 is assumed to be a Quadrature Phase Shift Keyed (QPSK) signal having in-phase (I) and quadrature phase (Q) signal samples. The I and Q signal samples, each being a multiple-bit value, are input to a QPSK despreader 230.

QPSK despreader 230 also receives the pilot PN sequences $PN_I$ and $PN_Q$ from pilot PN sequence generator 232. Pilot PN sequence generator 232 generates the PN sequences $PN_I$ and $PN_Q$ identical to those used in the base station according to sequence timing and state input (not shown) as provided from controller 78. QPSK despreader 230 removes the PN spreading on the raw I and Q signal samples to extract uncovered I and Q component samples. In the exemplary implementation the pilot signal uses the all-zero Walsh code. In using the all-zero Walsh code the PN spread pilot signal is the same as the I and Q PN spreading sequences themselves. Therefore by removing the PN spreading on the I and Q signal samples and filtering the result, the pilot is recovered.

The uncovered I and Q component samples are respectively output from QPSK despreader 230 to digital filters 234 and 236. The uncovered I and Q are also output to data recovery circuitry (not shown), which need not be described for an understanding of the present invention. Filters 234 and 236 are typically configured as simple first order, low pass, digital filters. The filtered I and Q samples output from filters 234 and 236 are samples of the I and Q components of the pilot signal and are referred to as Pilot I and Pilot Q samples. The Pilot I and Pilot Q samples are provided to a pilot signal strength measurement circuit 258, as well as to user digital data processing circuitry (not shown). The pilot signal strength measurement circuit 258 calculates the average signal strength of the Pilot I and Pilot Q samples. A demodulation path receive signal strength indicator signal 262 produced by circuit 258 is indicative of the calculated pilot strength value for the path being processed by the demodulation element.

Figure 6:
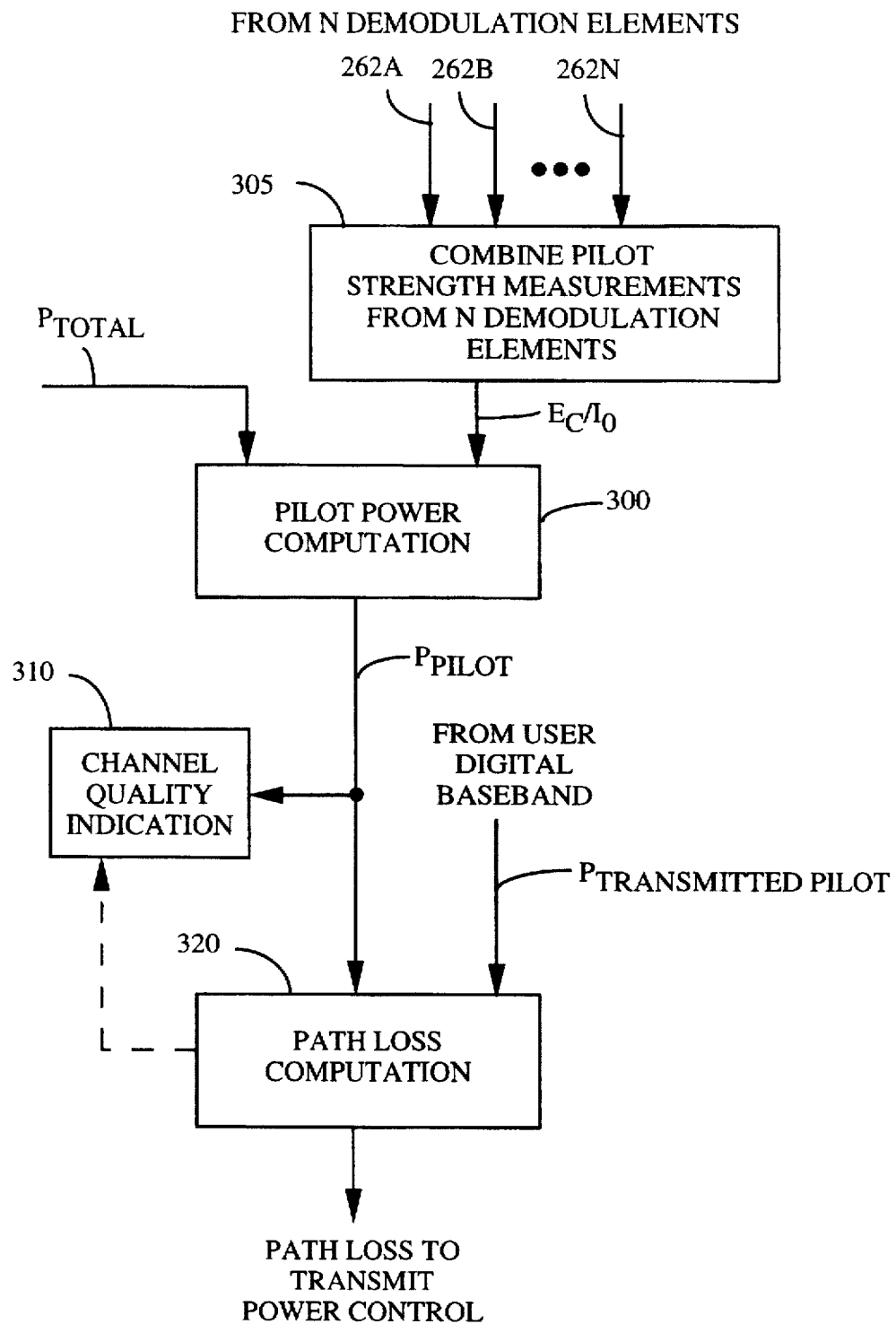
FIG. 6 is a flow chart representative of the manner in which received pilot power and path loss are determined in a accordance with the present invention.

FIG. 6 is a flow chart representative of the manner in which the received pilot power ($P_{pilot}$) and path loss are determined within the processor 78. As discussed above, the received pilot power ($P_{pilot}$) is determined as follows:

$$P_{pilot} = E_c/I_0 + P_{total}$$

where $P_{total}$ is the total received signal power (dBm) measured by power measurement circuit 96, and $E_c/I_0$ is the pilot strength measurement (dB). As is indicated by FIG. 6, the term $E_c/I_0$ is determined by combining, in combination block 305, the individual pilot signal strength measurements 262N—262N produced by the N demodulation elements 104. The value of $P_{pilot}$ is then computed by summation block 300, which adds the total received signal power $P_{total}$ (dBm) to the pilot strength measurement $E_c/I_0$ (dB). The value of $P_{pilot}$ may be displayed to a user of the mobile unit 16 on display 80 in order to provide a channel quality indication 310, such as a number of signal strength bars on a visual display 80 (see FIG. 2), or an audio tone indication of signal quality.

Once $P_{pilot}$ has been ascertained, the path loss between the base station 12 and the mobile unit 16 may be derived from $P_{pilot}$ and the base station transmitted pilot power ($P_{transmitted\ pilot}$). In the exemplary implementation the user digital baseband 82 extracts the value of $P_{transmitted\ pilot}$ from the 3-bit reserved field of the IS-95 Sync Channel Message transmitted by the base station 12. The path loss may then be computed by taking the difference, in path loss computation block 320, between the transmitted pilot power, $P_{transmitted\ pilot}$, and the received pilot power, $P_{pilot}$. The resultant correction signal may then be passed to the transmit power control circuitry (not shown) internal to transmitter 76 (FIG. 2) in order to set the initial transmit power of the mobile station. By using the actual received power of the CDMA pilot signal, and comparing that with a known pilot transmit power level of the cell-site, a more accurate estimate of the average reverse link path loss may be determined. Additionally, the resultant correction signal generated by path loss computation block 320 may also provide a channel quality indication 310 on display 80 (see FIG. 2), instead of using $P_{pilot}$.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A communication device having a power measurement circuit for determining the power of a first received spread-spectrum signal having a predetermined bandwidth, said communication device comprising:
   a first receiver circuit for measuring total received signal power in said predetermined bandwidth;
   a second receiver circuit, coupled to said first receiver circuit, for measuring a ratio of signal energy of said first received spread-spectrum signal to a total received power spectral density in said predetermined bandwidth; and
   a processor, coupled to said first receiver circuit and said second receiver circuit, for calculating power of said first received spread-spectrum signal in response to said measured total received signal power and said measured ratio of signal power.

2. The communication device of claim 1 wherein said first received spread spectrum signal is a pilot signal transmitted by a code division multiple access (CDMA) base station.

3. The communication device of claim 2 wherein said first receiver circuit comprises a power measurement circuit for generating a total received power signal in response to said measured total received signal power, said second receiver circuit comprises at least one demodulation element for despreading said pilot signal and for generating a CDMA energy ratio signal in response to said measured ratio of signal energy, and said processor generates a CDMA pilot power signal in response to said total received power signal and said CDMA energy ratio signal.

4. The communication device of claim 3 further comprising a display coupled to said processor for generating a quality indication in response to said CDMA pilot power signal.

5. The communication device of claim 1 further comprising a decoder, coupled to said second receiver circuit and said processor, for extracting a transmitted power level signal from a second received spread spectrum signal.

6. The communication device of claim 5 wherein said first received spread spectrum signal is a pilot signal transmitted by a code division multiple access (CDMA) base station and said second received spread spectrum signal is a sync signal transmitted by a code division multiple access (CDMA) base station.

7. The communication device of claim 6 wherein said first receiver circuit comprises a power measurement circuit for generating a total received power signal in response to said measured total received signal power, said second receiver circuit comprises at least one demodulation element for despreading said pilot signal and for generating a CDMA energy ratio signal in response to said measured ratio of signal energy, and said processor generates a path loss signal in response to said total received power signal, said CDMA energy ratio signal, and said transmitted power level signal.

8. The communication device of claim 7 further comprising a transmitter coupled to said processor, said transmitter having a variable gain and adjusting said variable gain in response to said path loss signal.

9. The communication device of claim 8 further comprising a display coupled to said processor for generating a quality indication in response to said path loss signal.

10. A method for determining the power of a first received spread-spectrum signal having a predetermined bandwidth in a code division multiple access communication device, comprising the steps of:
    measuring total received signal power in said predetermined bandwidth;
    measuring a ratio of signal energy of said first received spread-spectrum signal to a total received power spectral density in said predetermined bandwidth; and
    calculating power of said first received spread-spectrum signal in response to said measured total received signal power and said measured ratio of signal power.

11. The method of claim 10 wherein said first received spread spectrum signal is a pilot signal transmitted by a code division multiple access (CDMA) base station.

12. The method of claim 11 further comprising the steps of:
    generating a total received power signal in response to said measured total received signal power;
    despreading said pilot signal;
    generating a CDMA energy ratio signal in response to said measured ratio of signal energy; and
    generating a CDMA pilot power signal in response to said total received power signal and said CDMA energy ratio signal.

13. The method of claim 12 further comprising the step of generating a quality indication in response to said CDMA pilot power signal.

14. A method for estimating the reverse link path loss in a code division multiple access communication device which receives first and second spread spectrum signals having a predetermined bandwidth, the method comprising the steps of:
    measuring total received signal power in said predetermined bandwidth;
    measuring a ratio of signal energy of said first received spread-spectrum signal to a total received power spectral density in said predetermined bandwidth;
    calculating power of said first received spread-spectrum signal in response to said measured total received signal power and said measured ratio of signal power;
    extracting a transmitted power level signal from said second received spread spectrum signal; and
    calculating a reverse link path loss in response to said calculated power of said first received spread-spectrum signal and said extracted transmitted power level signal.

15. The method of claim 14 wherein said first received spread spectrum signal is a pilot signal transmitted by a code division multiple access (CDMA) base station and said second received spread spectrum signal is a sync signal transmitted by a code division multiple access (CDMA) base station.

16. The method of claim 15 further comprising the steps of:
    generating a total received power signal in response to said measured total received signal power;
    despreading said pilot signal;
    generating a CDMA energy ratio signal in response to said measured ratio of signal energy; and
    generating a path loss signal in response to said total received power signal, said CDMA energy ratio signal, and said transmitted power level signal.

17. The method of claim 16 further comprising the step of adjusting a transmission level in response to said path loss signal.

18. The method of claim 17 further comprising generating a quality indication in response to said path loss signal.

19. A communication system comprising:
    a first transmitter for transmitting a first spread spectrum signal having a predetermined bandwidth; and a receiver for receiving said first spread spectrum signal, comprising:
- a first receiver circuit for measuring total received signal power in said predetermined bandwidth;
- a second receiver circuit, coupled to said first receiver circuit, for measuring a ratio of signal energy of said first received spread-spectrum signal to a total received power spectral density in said predetermined bandwidth; and
- a processor, coupled to said first receiver circuit and said second receiver circuit, for calculating power of said first received spread-spectrum signal in response to said measured total received signal power and said measured ratio of signal power.

20. The communication system of claim 19 wherein said first received spread spectrum signal is a pilot signal and said first transmitter is a code division multiple access (CDMA) base station.

21. The communication system of claim 20 wherein said first receiver circuit comprises a power measurement circuit for generating a total received power signal in response to said measured total received signal power, said second receiver circuit comprises at least one demodulation element for despreading said pilot signal and for generating a CDMA energy ratio signal in response to said measured ratio of signal energy, and said processor generates a CDMA pilot power signal in response to said total received power signal and said CDMA energy ratio signal.

22. The communication system of claim 21 further comprising a display coupled to said processor for generating a quality indication in response to said CDMA pilot power signal.

23. The communication system of claim 19 wherein said first transmitter transmits a second spread spectrum signal and said receiver receives said second spread spectrum signal and said receiver further comprises a decoder, coupled to said second receiver circuit and said processor, for extracting a transmitted power level signal from said second received spread spectrum signal.

24. The communication system of claim 23 wherein said first received spread spectrum signal is a pilot signal, said second received spread spectrum signal is a sync signal, and said first transmitter is a code division multiple access (CDMA) base station.

25. The communication system of claim 24 wherein said first receiver circuit comprises a power measurement circuit for generating a total received power signal in response to said measured total received signal power, said second receiver circuit comprises at least one demodulation element for despreading said pilot signal and for generating a CDMA energy ratio signal in response to said measured ratio of signal energy, and said processor generates a path loss signal in response to said total received power signal, said CDMA energy ratio signal, and said transmitted power level signal.

26. The communication system of claim 25 further comprising a second transmitter coupled to said processor, said second transmitter having a variable gain and adjusting said variable gain in response to said path loss signal.

27. The communication system of claim 26 further comprising a display coupled to said processor for generating a quality indication in response to said path loss signal.

* * * * *